(12) United States Patent
Kodali et al.

(10) Patent No.: US 11,490,293 B2
(45) Date of Patent: Nov. 1, 2022

(54) FAST RETURN TO 5G NEW RADIO

(71) Applicant: APPLE INC., Cupertino, CA (US)

(72) Inventors: Sree Ram Kodali, Cupertino, CA (US); Farouk Belghoul, Cupertino, CA (US); Shashikant Tiwari, Cupertino, CA (US); Sridhar Prakasam, Cupertino, CA (US); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 310 days.

(21) Appl. No.: 16/863,522

(22) Filed: Apr. 30, 2020

(65) Prior Publication Data

US 2021/0345185 A1 Nov. 4, 2021

(51) Int. Cl.
*H04W 4/00* (2018.01)
*H04W 36/00* (2009.01)
*H04W 76/38* (2018.01)

(52) U.S. Cl.
CPC ... *H04W 36/0022* (2013.01); *H04W 36/0072* (2013.01); *H04W 36/0085* (2018.08); *H04W 76/38* (2018.02)

(58) Field of Classification Search
CPC ......... H04W 36/0011; H04W 36/0016; H04W 36/0022; H04W 36/0033; H04W 36/0072; H04W 36/0085; H04W 76/30; H04W 76/32; H04W 76/34; H04W 76/38
See application file for complete search history.

(56) References Cited

U.S. PATENT DOCUMENTS

2017/0295521 A1* 10/2017 Duan ................ H04W 36/0022

\* cited by examiner

*Primary Examiner* — Matthew W Genack

(57) ABSTRACT

Re-connecting to a first radio access network (RAN) of a first radio access technology (RAT) may include initially connecting to the first RAN. A connection associated with a voice call may then be connected that includes connecting to a RAN of a second RAT. In response to the voice call connecting to the second RAN, information for both a frequency and a cell associated with connecting to the first RAN may be stored. An end to the voice call may be identified. In response to determining that the voice call has ended, a timer may be generated at the UE that comprises a specified time period and the timer and the information stored for both the frequency and the cell associated with connecting to the first RAN may be utilized to re-connect to the first RAN.

23 Claims, 8 Drawing Sheets

FAST RETURN TO 5G NEW RADIO

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
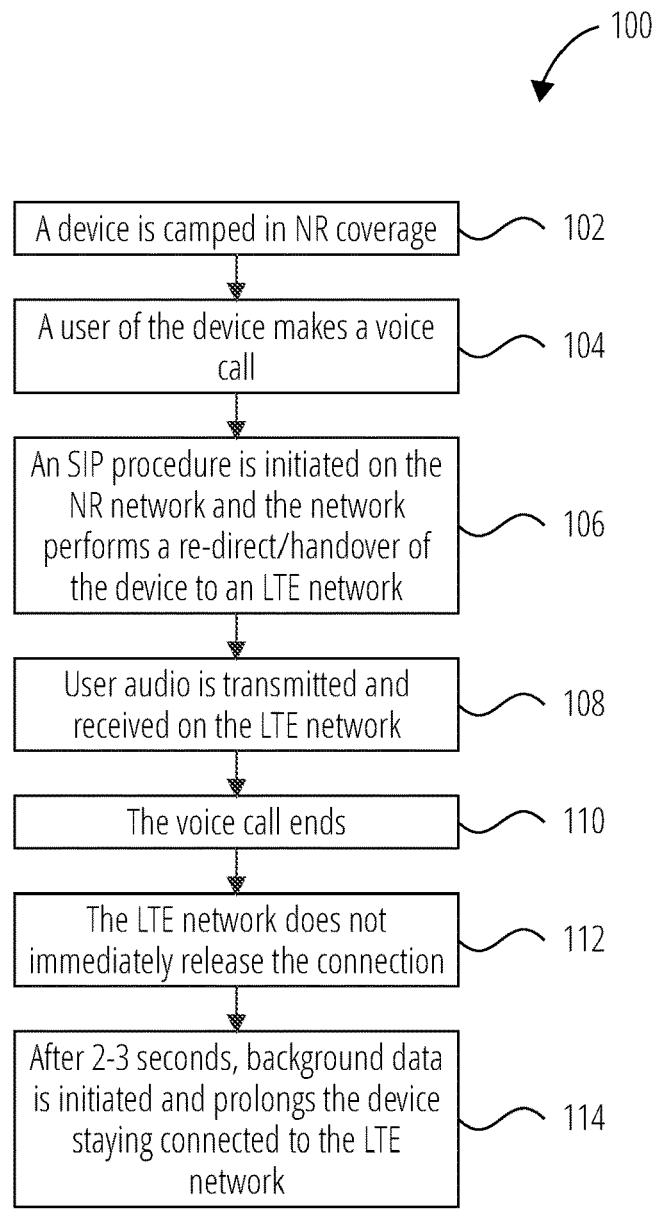
FIG. 1 illustrates a flowchart in accordance with one embodiment.

With respect to 5G New Radio (NR) networks, voice calls are only supported through Internet Protocol (IP) multimedia subsystem (IMS) (i.e., circuit switched (CS) calls are not possible in NR networks).

From the 5G NR network perspective with respect to voice calls, the network indicates IMS support over NR through a voice over IP (VoIP) bit in registration accept (in 5GS network feature support).

From a user equipment (UE) perspective, the UE has two possible options to support voice over NR: 1. Voice over NR (VoNR): includes session initiation protocol (SIP) call setup and audio real-time transport protocol (RTP) packet handling on NR; and 2. Evolved Packet System (EPS) Fallback: includes SIP call setup initiation on NR, and then fallback to 4G long term evolution (LTE) for audio RTP packet handling.

Some 5G NR networks deployed in the near future may only support EPS Fallback. Even for VoNR voice calls, a UE may get handed over to LTE to continue as a voice over LTE (VoLTE) call. After terminating such a VoLTE call, the UE may stay connected to the LTE network until radio resource control (RRC) connection release occurs. Similarly, VoNR calls may be handed over to UMTS using Single Radio Voice Call Continuity (SRVCC). Each of these types of calls may end up in a low priority RAT (i.e., LTE or UMTS). Accordingly, fast return to NR (FrNR) as further described herein may be applicable to each of these scenarios.

Regarding 5GS network feature support, 3GPP 24.501 includes:

9.11.3.5 5GS Network Feature Support

The purpose of the 5GS network feature support information element is to indicate whether certain features are supported by the network.

The 5GS network feature support information element is coded as shown in figure 9.11.3.5.1 and table 9.11.3.5.1.

The 5GS network feature support is a type 4 information element with a minimum length of 3 octets and a maximum length of 5 octets.

| 8 | 7 | 6 | 5 | 4 | 3 | 2 | 1 | |
|---|---|---|---|---|---|---|---|---|
| 5GS network feature support IEI | | | | | | | | octet 1 |
| Length of 5GS network feature support contents | | | | | | | | octet 2 |
| MPSI | IWKN26 | EMF | | EMC | | IMS-VoPS-N3GPP | IMS-VoPS-3GPP | octet 3 |
| 0 Spare | 0 Spare | 0 Spare | 0 Spare | 0 Spare | 0 Spare | MCSI | EMCN3 | octet 4 |
| 0 | 0 | 0 | 0 | 0 Spare | 0 | 0 | 0 | octet 5* |

FIG. 9.11.3.5.1: 5GS network feature support information element

TABLE 9.11.3.5.1

5GS network feature support information element

IMS voice over PS session over 3GPP access indicator (IMS-VoPS-3GPP) (octet 3, bit 1)
This bit indicates the support of IMS voice over PS session over 3GPP access (see NOTE 1)

Bit

| | |
|---|---|
| 1 | IMS voice over PS session not supported over 3GPP access |
| 0 1 | IMS voice over PS session supported over 3GPP access |

With respect to EPS Fallback from the UE perspective, 3GPP 38.306 includes information regarding VoNR capability from a UE being indicated to a network through a UE capability information message, and the following IMS parameters:

4.2.13 IMS Parameters

| Definitions for parameters | Per M | FDD-TDD DIFF | FR1-FR2 DIFF |
|---|---|---|---|
| voiceOverEUTRA-5GC Indicates whether the UE supports IMS voice over E-UTRA via 5GC. | UE No | No | No |
| voiceOverNR Indicates whether the UE supports IMS voice over NR. It is mandated to the IMS voice capable UE in NR otherwise optional. | UE No | No | Yes |

In addition, 3GPP 36.306 includes information regarding EPS Fallback capability from a UE being indicated to a network through a UE capability information message. In particular, 4.3.1A NR packet data convergence protocol (PDCP) parameters include: IMS-VoiceOverNR-PDCP-MCG-Bearer-15, which indicates whether the UE supports IMS voice over NR PDCP for a master cell group (MCG) bearer.

Notably, fast return to NR (FrNR) has some distinctions in comparison to fast return to LTE (FrLTE). In particular, FrLTE includes a device (i.e., UE) sending an extended service request over LTE to the network and the network immediately re-directing/performing a handover of the device to CS (3G/2G) radio access technology (RAT). Once the call ends, network release signaling connection for CS radio access bearer (RAB). If there is no active packet switched (PS) RAB (for internet data), there will be an immediate RRC Connection release. Some networks may not provide LTE re-direction information in that connection release. A such, in FrLTE the device may internally re-direct back to the last known LTE frequency after connection release.

In contrast, in FrNR there is no signaling connection concept because LTE is PS only network. The network typically takes 10 seconds to release radio resource control (RRC) connection after ending a VoLTE voice call. The network may or may not provide NR re-direction information in the LTE connection release. Regardless of whether such re-direction info is provided, a user may be negatively impacted is already seen by the previously discussed 10 second timer. In particular, the device is stuck in lower RAT (i.e., LTE) for an extended duration after the voice call has ended. In addition, such impact may be magnified because of some background data which will further delay re-selection back to NR.

FIG. 1 illustrates a flowchart of a typical voice call scenario 100. In block 102, a device is camped in NR coverage. For instance, a mobile device (e.g., phone, tablet, etc.) may be connected to an NR network. In block 104, a user of the device makes or receives a voice call using the device. In block 106, a session initiation protocol (SIP) procedure is initiated on the NR network, and the network performs re-direct/handover the device to an LTE network. In block 108, user audio is transmitted and received over the LTE network (i.e., VoLTE). In block 110, the voice call ends. In block 112, the LTE network does not immediately release the connection (e.g., an RRC connection). Notably, such delay occurs because networks typically maintain a 10 second inactivity timer to release a connection. In other words, the connection will only be dropped if there is no data transmitted or received for at least 10 seconds. In block 114, after a period of time (e.g., 2-3 seconds), background data is initiated and prolongs the device staying connected to the LTE network instead of returning to the NR network.

As briefly described above, this may create a number of negative impacts. First, the user may be connected to a slower network (i.e., LTE) even after the voice call has ended. Second, in a relatively short period of time after the call has ended (e.g., 2-3 seconds), background data may be initiated, resulting in a prolonged connection to the LTE network instead of the NR network.

Accordingly, the principles described herein provide a solution for overcoming these potential negative impacts. In particular, the UE may remember both the NR frequency and cell associated with the UEs connection to the NR network during the voice call (e.g., EPS fallback, VoNR to VoLTE, VoNR to UMTS through SRVCC). The initial NR frequency and cell associated with the UEs connection to the NR network is also referred to herein as the Last-NR cell.

The following procedure describes FrNR: 1. After EPS Fallback or VoNR to VoLTE, and the VoLTE call is ended, an "n" milli second timer is started (referred to herein as FrNR timer). In some embodiments, the FrNR timer may have a duration within a range of between 50 ms and 1,000 ms. Typically, the FrNR timer may have a duration within a range of between 100 ms to 500 ms; 2. If the LTE network performed RRC connection release with re-direction or handover to NR before the FrNR timer has expired, the FrNR timer is stopped as the return to the NR network has already been completed; 3. Else, if the LTE network performed RRC connection release without re-direction to NR and the FrNR timer is still running, the FrNR timer is stopped and immediate re-selection is forced to the Last-NR cell (irrespective of measurements or re-selection thresholds). If such re-selection is not successful, cell selection on other NR cells in stored list search (SLS) DB is attempted for a specified period of time (e.g., the next two seconds or less). If NR cell selection is not successful even after the specified time, the UE re-connects to the LTE network; 3. Else If Device is still in LTE connected mode and the FrNR timer has expired, the FrNR timer is stopped, the LTE RRC connection is locally aborted, and re-direction to the Last-NR cell is attempted. If such re-direction is successful, the device will perform the registration procedure as described in 3GPP 24.501 (and shown above). If such re-direction is not successful, cell selection on other NR cells in SLS DB may be attempted for a specified period of time (e.g., the next two seconds or less). If such NR cell selection is not successful even after the specified period of time, the device may return to the LTE network. Furthermore, if such forced NR re-direction/NR cell selection is not successful, the device may perform a tracking area update procedure to avoid RRC state mismatch problems in addition to returning to LTE.

Alternatively, rather than performing a tracking area procedure, the device can also perform one of the following procedures: attach request, service request even though there is no user data to transmit, or RRC connection re-establishment.

Notably, the procedures described above may also be applicable to VoNR calls handed over to UMTS using SRVCC, including the procedures used when FrNR initially fails. For instance, if utilizing information associated with the last NR cell to re-connect to the NR network is unsuccessful, any of the above-described actions may be taken (e.g., using cell selection on NR cells other than the last NR cell, returning to the UMTS network when re-connecting to the NR network is unsuccessful, etc.).

Figure 2:
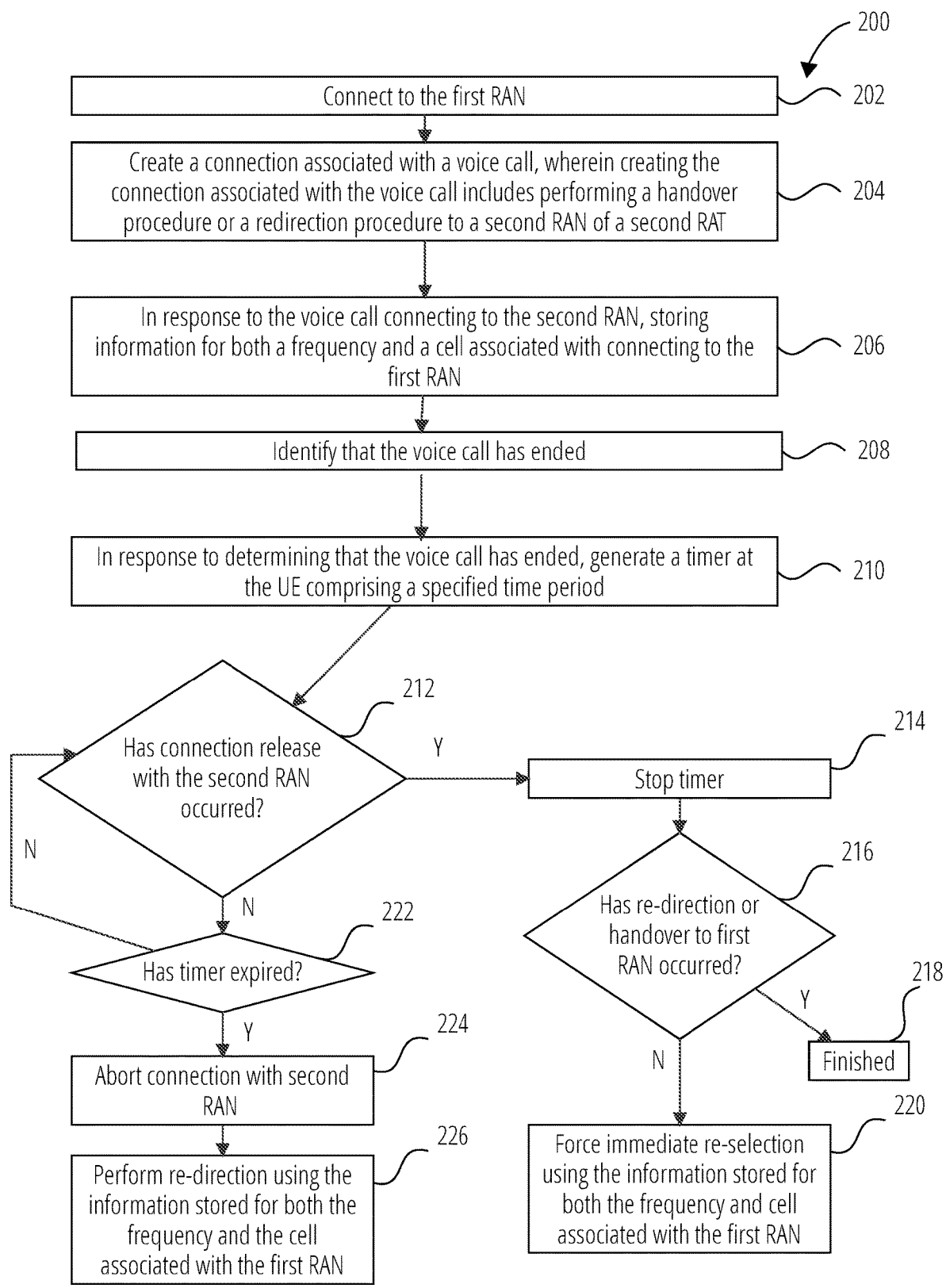
FIG. 2 illustrates a method in accordance with one embodiment.

FIG. 2 illustrates a flowchart of a method 200 of a user equipment (UE) re-connecting to a first radio access network (RAN) of a first radio access technology (RAT). For instance, the first RAN and first RAT may be associated with a 5G NR network. In block 202, the method 200 connects to the first RAN. In block 204, the method 200 creates a connection associated with a voice call. Creating the connection associated with the voice call includes performing a handover procedure or a redirection procedure to a second RAN of a second RAT. The second RAN and the second RAT may be associated with an LTE network or a UMTS network, as further described herein. In block 206, the method 200, in response to the voice call connecting to the second RAN, stores information for both a frequency and a cell associated with connecting to the first RAN. In other words, the UE stores information related to the frequency and cell associated with the UE's initial connect to the first RAN/NR network in block 202. In block 208, the method 200 identifies that the voice call has ended. In block 210, the method 200, in response to determining that the voice call has ended, generates a timer at the UE comprising a specified time period. Notably, networks may include generally perform RRC connection release after 10 seconds. In addition, data transmission or reception during the 10 seconds may prolong the duration of the connection to the second RAN/LTE network even longer than 10 seconds. As such, the timer generated in block 210 may comprise a much shorter time period (e.g., between 100 and 500 milliseconds).

In decision block 212, the method 200 determines whether a connection release associated with the second RAN has occurred while the generated timer is still running (i.e., before expiration of the specified time period of the generated timer). If so, the method 200 progresses to block 214. In block 214, the method 200 stops the generated timer. In decision block 216, the method 200 determines whether re-direction or handover to the first RAN (i.e., the NR network) has occurred. If so, the method 200 is finished as shown by block 218. If not, the method 200 progresses to block 220. In block 220, the method 200 forces immediate re-selection to the initial cell of the first RAN (i.e., the NR network) to which the UE was connected in block 202 by utilizing information stored for both the frequency and cell associated with such initial cell.

Returning to decision block 212, if connection release associated with the second RAN (i.e., the LTE network) has not occurred, the method 200 progresses to decision block 222. In decision block 222, the method 200 determines whether the UE-generated timer has ended. If not, decision block 212 will be repeated until the UE-generated timer has ended. Once the UE-generated timer has ended, the method 200 progresses to block 224. In block 224, the method 200 aborts the connection with the second RAN (i.e., the LTE network). In block 226, the method 200 performs re-direction to the initial cell of the first RAN (i.e., the NR network) to which the UE was connected in block 202 by utilizing information stored for both the frequency and cell associated with such initial cell.

Figure 3:
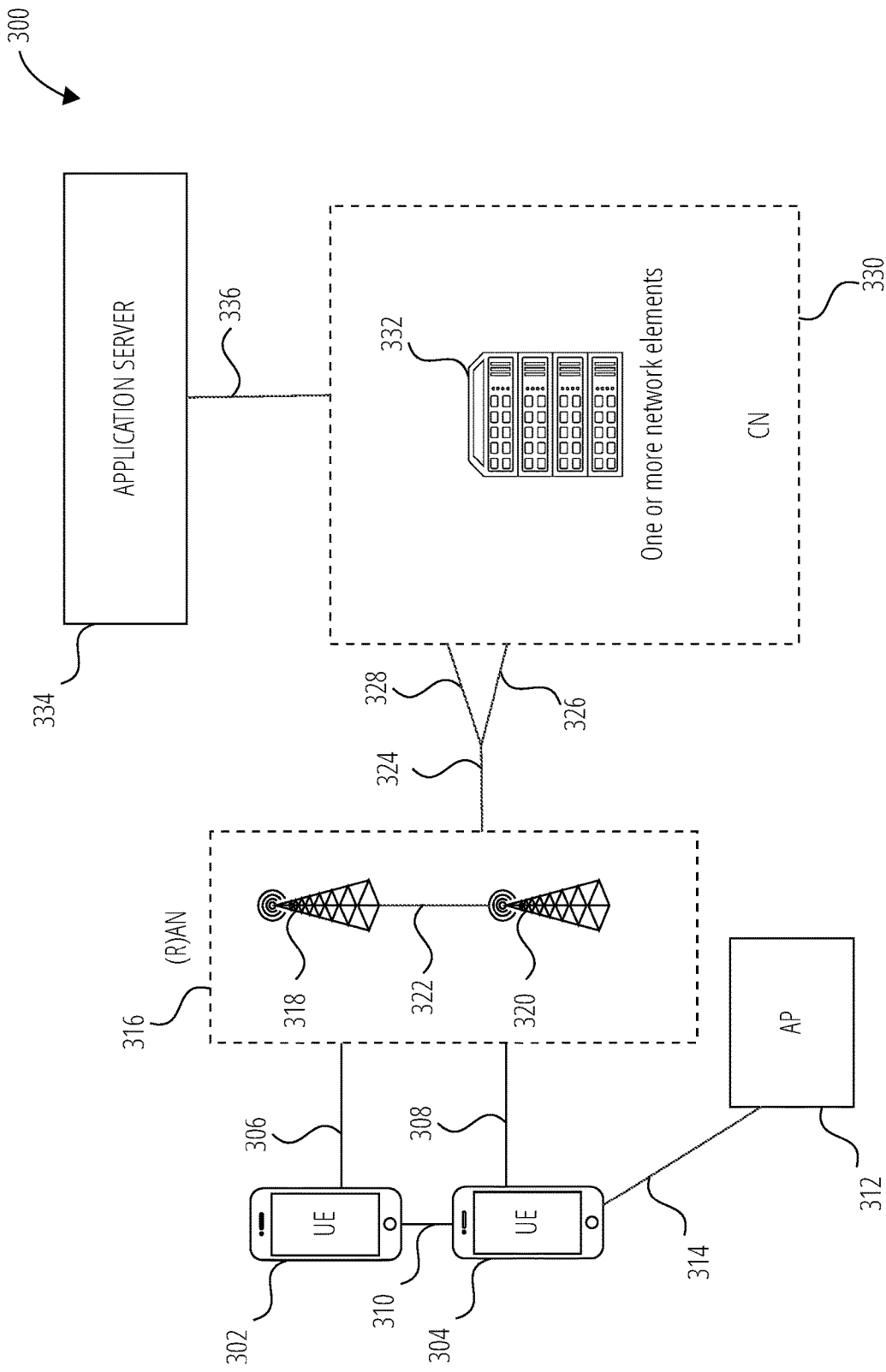
FIG. 3 illustrates a system in accordance with one embodiment.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 302 and UE 304. In this example, the UE 302 and the UE 304 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 302 and/or the UE 304 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 302 and UE 304 may be configured to connect, for example, communicatively couple, with an access node or radio access node (shown as (R)AN 316). In embodiments, the (R)AN 316 may be an NG RAN or a SG RAN, an E-UTRAN, or a legacy RAN, such as a UTRAN or GERAN. As used herein, the term "NG RAN" or the like may refer to a (R)AN 316 that operates in an NR or SG system, and the term "E-UTRAN" or the like may refer to a (R)AN 316 that operates in an LTE or 4G system. The UE 302 and UE 304 utilize connections (or channels) (shown as connection 306 and connection 308, respectively), each of which comprises a physical communications interface or layer (discussed in further detail below).

In this example, the connection 306 and connection 308 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 302 and UE 304 may directly exchange communication data via a ProSe interface 310. The ProSe interface 310 may alternatively be referred to as a sidelink (SL) interface 110 and may comprise one or more logical channels, including but not limited to a PSCCH, a PSSCH, a PSDCH, and a PSBCH.

The UE 304 is shown to be configured to access an AP 312 (also referred to as "WLAN node," "WLAN," "WLAN Termination," "WT" or the like) via connection 314. The connection 314 can comprise a local wireless connection, such as a connection consistent with any IEEE 802.11 protocol, wherein the AP 312 would comprise a wireless fidelity (Wi-Fi®) router. In this example, the AP 312 may be connected to the Internet without connecting to the core network of the wireless system (described in further detail below). In various embodiments, the UE 304, (R)AN 316, and AP 312 may be configured to utilize LWA operation and/or LWIP operation. The LWA operation may involve the UE 304 in RRC_CONNECTED being configured by the RAN node 318 or the RAN node 320 to utilize radio resources of LTE and WLAN. LWIP operation may involve the UE 304 using WLAN radio resources (e.g., connection 314) via IPsec protocol tunneling to authenticate and encrypt packets (e.g., IP packets) sent over the connection 314. IPsec tunneling may include encapsulating the entirety of original IP packets and adding a new packet header, thereby protecting the original header of the IP packets.

The (R)AN 316 can include one or more AN nodes, such as RAN node 318 and RAN node 320, that enable the connection 306 and connection 308. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 300 (e.g., an eNB). According to various embodiments, the RAN node 318 or RAN node 320 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 318 or RAN node 320 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 318 or RAN node 320); a MAC/PHY split wherein RRC, PDCP, RLC, and MAC layers are operated by the CRAN/vBBUP and the PHY layer is operated by individual RAN nodes (e.g., RAN node 318 or RAN node 320); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 318 or RAN node 320 to perform other virtualized applications. In some implementations, an individual RAN node may represent individual gNB-DUs that are connected to a gNB-CU via individual F1 interfaces (not shown by FIG. 3). In these implementations, the gNB-DUs may include one or more remote radio heads or RFEMs, and the gNB-CU may be operated by a server that is located in the (R)AN 316 (not shown) or by a server pool in a similar manner as the CRAN/vBBUP. Additionally, or alternatively, one or more of the RAN node 318 or RAN node 320 may be next generation eNBs (ng-eNBs), which are RAN nodes that provide E-UTRA user plane and control plane protocol terminations toward the UE 302 and UE 304, and are connected to an SGC via an NG interface (discussed infra). In V2X scenarios one or more of the RAN node 318 or RAN node 320 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 318 and/or the RAN node 320 can terminate the air interface protocol and can be the first point of contact for the UE 302 and UE 304. In some embodiments, the RAN node 318 and/or the RAN node 320 can fulfill various logical functions for the (R)AN 316 including, but not limited to, radio network controller (RNC) functions such as radio bearer management, uplink and downlink dynamic radio resource management and data packet scheduling, and mobility management.

In embodiments, the UE 302 and UE 304 can be configured to communicate using OFDM communication signals with each other or with the RAN node 318 and/or the RAN node 320 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 318 and/or the RAN node 320 to the UE 302 and UE 304, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 302 and UE 304 and the RAN node 318 and/or the RAN node 320 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 302 and UE 304 and the RAN node 318 or RAN node 320 may operate using LAA, eLAA, and/or feLAA mechanisms. In these implementations, the UE 302 and UE 304 and the RAN node 318 or RAN node 320 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 302 and UE 304, RAN node 318 or RAN node 320, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 302, AP 312, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds ($\mu$s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 302 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 302 and UE 304. The PDCCH carries information about the transport format and resource allocations related to the PDSCH channel, among other things. It may also inform the UE 302 and UE 304 about the transport format, resource allocation, and HARQ information related to the uplink shared channel. Typically, downlink scheduling (assigning control and shared channel resource blocks to the UE 304 within a cell) may be performed at any of the RAN node 318 or RAN node 320 based on channel quality information fed back from any of the UE 302 and UE 304. The downlink resource assignment information may be sent on the PDCCH used for (e.g., assigned to) each of the UE 302 and UE 304.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 318 or RAN node 320 may be configured to communicate with one another via interface 322. In embodiments where the system 300 is an LTE system (e.g., when CN 330 is an EPC), the interface 322 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 302 from an SeNB for user data; information of PDCP PDUs that were not delivered to a UE 302; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system (e.g., when CN 330 is an 5GC), the interface 322 may be an Xn interface. The Xn interface is defined between two or more RAN nodes (e.g., two or more gNBs and the like) that connect to 5GC, between a RAN node 318 (e.g., a gNB) connecting to 5GC and an eNB, and/or between two eNBs connecting to 5GC (e.g., CN 330). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 302 in a connected mode (e.g., CM-CONNECTED) including functionality to manage the UE mobility for connected mode between one or more RAN node 318 or RAN node 320. The mobility support may include context transfer from an old (source) serving RAN node 318 to new (target) serving RAN node 320; and control of user plane tunnels between old (source) serving RAN node 318 to new (target) serving RAN node 320. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 316 is shown to be communicatively coupled to a core network-in this embodiment, CN 330. The CN 330 may comprise one or more network elements 332, which are configured to offer various data and telecommunications services to customers/subscribers (e.g., users of UE 302 and UE 304) who are connected to the CN 330 via the (R)AN 316. The components of the CN 330 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 330 may be referred to as a network slice, and a logical instantiation of a portion of the CN 330 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 334 may be an element offering applications that use IP bearer resources with the core network (e.g., UMTS PS domain, LTE PS data services, etc.). The application server 334 can also be configured to support one or more communication services (e.g., VoIP sessions, PTT sessions, group communication sessions, social networking services, etc.) for the UE 302 and UE 304 via the EPC. The application server 334 may communicate with the CN 330 through an IP communications interface 336.

In embodiments, the CN 330 may be an SGC, and the (R)AN 116 may be connected with the CN 330 via an NG interface 324. In embodiments, the NG interface 324 may be split into two parts, an NG user plane (NG-U) interface 326, which carries traffic data between the RAN node 318 or RAN node 320 and a UPF, and the S1 control plane (NG-C) interface 328, which is a signaling interface between the RAN node 318 or RAN node 320 and AMFs.

In embodiments, the CN 330 may be a SG CN, while in other embodiments, the CN 330 may be an EPC). Where CN 330 is an EPC, the (R)AN 116 may be connected with the CN 330 via an S1 interface 324. In embodiments, the S1 interface 324 may be split into two parts, an S1 user plane (S1-U) interface 326, which carries traffic data between the RAN node 318 or RAN node 320 and the S-GW, and the S1-MME interface 328, which is a signaling interface between the RAN node 318 or RAN node 320 and MMEs.

Figure 4:
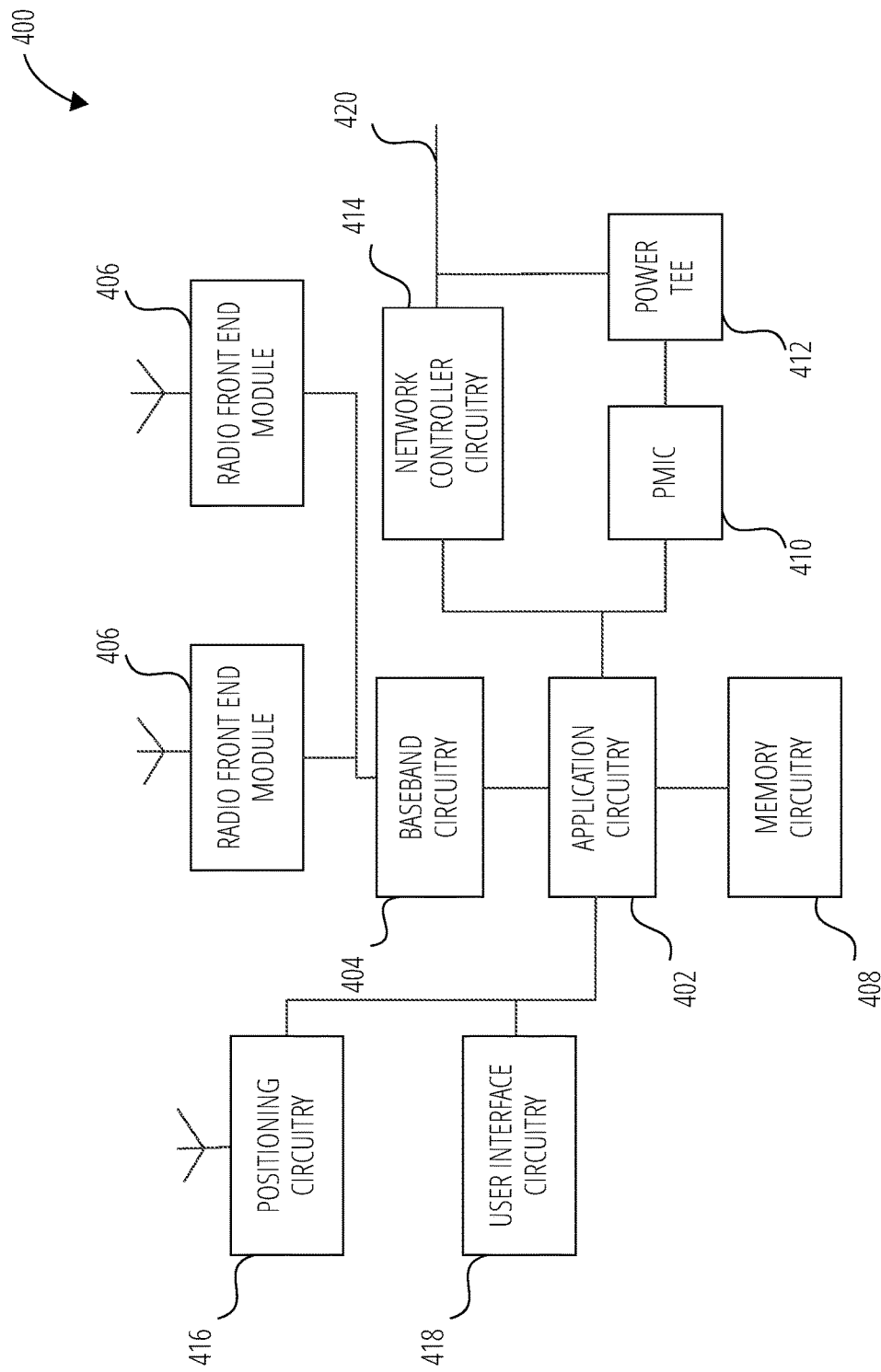
FIG. 4 illustrates an infrastructure equipment in accordance with one embodiment.

FIG. 4 illustrates an example of infrastructure equipment 400 in accordance with various embodiments. The infrastructure equipment 400 may be implemented as a base station, radio head, RAN node, AN, application server, and/or any other element/device discussed herein. In other examples, the infrastructure equipment 400 could be implemented in or by a UE.

The infrastructure equipment 400 includes application circuitry 402, baseband circuitry 404, one or more radio front end module 406 (RFEM), memory circuitry 408, power management integrated circuitry (shown as PMIC 410), power tee circuitry 412, network controller circuitry 414, network interface connector 420, satellite positioning circuitry 416, and user interface circuitry 418. In some embodiments, the device infrastructure equipment 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 402 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 402 may be coupled with or may include memory/storage elements and may be configured to execute instructions stored in the memory/storage to enable various applications or operating systems to run on the infrastructure equipment 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 402 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 402 may comprise, or may be, a special-purpose processor/controller to operate according to the various embodiments herein. As examples, the processor(s) of application circuitry 402 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 400 may not utilize application circuitry 402, and instead may include a special-purpose processor/controller to process IP data received from an EPC or 5GC, for example.

In some implementations, the application circuitry 402 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 402 may comprise logic blocks or logic fabric, and other interconnected resources that may be programmed to perform various functions, such as the procedures, methods, functions, etc. of the various embodiments discussed herein. In such embodiments, the circuitry of application circuitry 402 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 404 may be implemented, for example, as a solder-down substrate including one or more integrated circuits, a single packaged integrated circuit soldered to a main circuit board or a multi-chip module containing two or more integrated circuits.

The user interface circuitry 418 may include one or more user interfaces designed to enable user interaction with the infrastructure equipment 400 or peripheral component interfaces designed to enable peripheral component interaction with the infrastructure equipment 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 406, which incorporates both mmWave antennas and sub-mmWave.

The memory circuitry 408 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 408 may be implemented as one or more of solder down packaged integrated circuits, socketed memory modules and plug-in memory cards.

The PMIC 410 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 412 may provide for electrical power drawn from a network cable to provide both power supply and data connectivity to the infrastructure equipment 400 using a single cable.

The network controller circuitry 414 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 420 using a physical connection, which may be electrical (commonly referred to as a "copper interconnect"), optical, or wireless. The network controller circuitry 414 may include one or more dedicated processors and/or FPGAs to communicate using one or more of the aforementioned protocols. In some implementations, the network controller circuitry 414 may include multiple controllers to provide connectivity to other networks using the same or different protocols.

The positioning circuitry 416 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 416 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 416 may include a Micro-Technology for Positioning, Navigation, and Timing (Micro-PNT) IC that uses a master timing clock to perform position tracking/estimation without GNSS assistance. The positioning circuitry 416 may also be part of, or interact with, the baseband circuitry 404 and/or radio front end module 406 to communicate with the nodes and components of the positioning network. The positioning circuitry 416 may also provide position data and/or time data to the application circuitry 402, which may use the data to synchronize operations with various infrastructure, or the like. The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCIe), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 5:
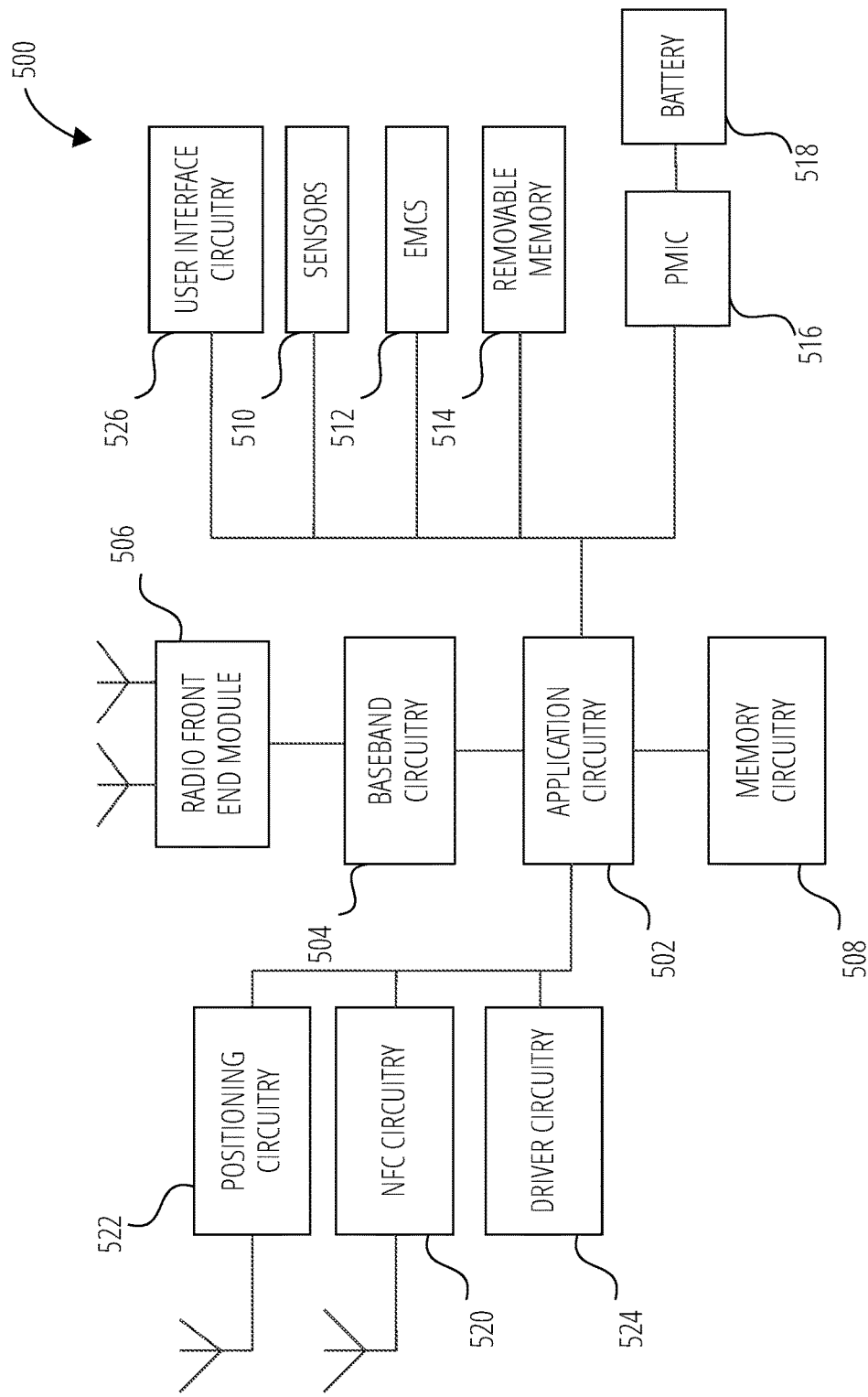
FIG. 5 illustrates a platform in accordance with one embodiment.

FIG. 5 illustrates an example of a platform 500 in accordance with various embodiments. In embodiments, the computer platform 500 may be suitable for use as UEs, application servers, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 502 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 502 may be coupled with or may include memory/storage elements and may be configured to execute instructions stored in the memory/storage to enable various applications or operating systems to run on the platform 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 502 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 502 may comprise, or may be, a special-purpose processor/controller to operate according to the various embodiments herein.

As examples, the processor(s) of application circuitry 502 may include an Intel® Architecture Core™ based processor, such as a Quark™, an Atom™, an i3, an i5, an i7, or an MCU-class processor, or another such processor available from Intel® Corporation. The processors of the application circuitry 502 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 502 may be a part of a system on a chip (SoC) in which the application circuitry 502 and other components are formed into a single integrated circuit, or a single package, such as the Edison™ or Galileo™ SoC boards from Intel® Corporation.

Additionally or alternatively, application circuitry 502 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 502 may comprise logic blocks or logic fabric, and other interconnected resources that may be programmed to perform various functions, such as the procedures, methods, functions, etc. of the various embodiments discussed herein. In such embodiments, the circuitry of application circuitry 502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 504 may be implemented, for example, as a solder-down substrate including one or more integrated circuits, a single packaged integrated circuit soldered to a main circuit board or a multi-chip module containing two or more integrated circuits.

The radio front end module 506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 506, which incorporates both mmWave antennas and sub-mmWave.

The memory circuitry 508 may include any number and type of memory devices used to provide for a given amount of system memory. As examples, the memory circuitry 508 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 508 may be developed in accordance with a Joint Electron Devices Engineering Council (JEDEC) low power double data rate (LPDDR)-based design, such as LPDDR2, LPDDR3, LPDDR4, or the like. Memory circuitry 508 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 508 may be on-die memory or registers associated with the application circuitry 502. To provide for persistent storage of information such as data, applications, operating systems and so forth, memory circuitry 508 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 500 may incorporate the three-dimensional (3D) cross-point (XPOINT) memories from Intel® and Micron®.

The removable memory 514 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensors 510 and electro-mechanical components (shown as EMCs 512), as well as removable memory devices coupled to removable memory 514.

The sensors 510 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 512 include devices, modules, or subsystems whose purpose is to enable platform 500 to change its state, position, and/or orientation, or move or control a mechanism or (sub)system. Additionally, EMCs 512 may be configured to generate and send messages/signaling to other components of the platform 500 to indicate a current state of the EMCs 512. Examples of the EMCs 512 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 512 based on one or more captured events and/or instructions or control signals received from a service provider and/or various clients. In some implementations, the interface circuitry may connect the platform 500 with positioning circuitry 522. The positioning circuitry 522 includes circuitry to receive and decode signals transmitted/ broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 522 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 522 may include a Micro-PNT IC that uses a master timing clock to perform position tracking/estimation without GNSS assistance. The positioning circuitry 522 may also be part of, or interact with, the baseband circuitry 504 and/or radio front end module 506 to communicate with the nodes and components of the positioning network. The positioning circuitry 522 may also provide position data and/or time data to the application circuitry 502, which may use the data to synchronize operations with various infrastructure (e.g., radio base stations), for turn-by-turn navigation applications, or the like.

In some implementations, the interface circuitry may connect the platform 500 with Near-Field Communication circuitry (shown as NFC circuitry 520). The NFC circuitry 520 is configured to provide contactless, short-range communications based on radio frequency identification (RFID) standards, wherein magnetic field induction is used to enable communication between NFC circuitry 520 and NFC-enabled devices external to the platform 500 (e.g., an "NFC touchpoint"). NFC circuitry 520 comprises an NFC controller coupled with an antenna element and a processor coupled with the NFC controller. The NFC controller may be a chip/IC providing NFC functionalities to the NFC circuitry 520 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 520, or initiate data transfer between the NFC circuitry 520 and another active NFC device (e.g., a smartphone or an NFC-enabled POS terminal) that is proximate to the platform 500.

The driver circuitry 524 may include software and hardware elements that operate to control particular devices that are embedded in the platform 500, attached to the platform 500, or otherwise communicatively coupled with the platform 500. The driver circuitry 524 may include individual drivers allowing other components of the platform 500 to interact with or control various input/output (I/O) devices that may be present within, or connected to, the platform 500. For example, driver circuitry 524 may include a display driver to control and allow access to a display device, a touchscreen driver to control and allow access to a touchscreen interface of the platform 500, sensor drivers to obtain sensor readings of sensors 510 and control and allow access to sensors 510, EMC drivers to obtain actuator positions of the EMCs 512 and/or control and allow access to the EMCs 512, a camera driver to control and allow access to an embedded image capture device, audio drivers to control and allow access to one or more audio devices.

The power management integrated circuitry (shown as PMIC 516) (also referred to as "power management circuitry") may manage power provided to various components of the platform 500. In particular, with respect to the baseband circuitry 504, the PMIC 516 may control power-source selection, voltage scaling, battery charging, or DC-to-DC conversion. The PMIC 516 may often be included when the platform 500 is capable of being powered by a battery 518, for example, when the device is included in a UE.

In some embodiments, the PMIC 516 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 518 may power the platform 500, although in some examples the platform 500 may be mounted deployed in a fixed location, and may have a power supply coupled to an electrical grid. The battery 518 may be a lithium ion battery, a metal-air battery, such as a zinc-air battery, an aluminum-air battery, a lithium-air battery, and the like. In some implementations, such as in V2X applications, the battery 518 may be a typical lead-acid automotive battery.

In some implementations, the battery 518 may be a "smart battery," which includes or is coupled with a Battery Management System (BMS) or battery monitoring integrated circuitry. The BMS may be included in the platform 500 to track the state of charge (SoCh) of the battery 518. The BMS may be used to monitor other parameters of the battery 518 to provide failure predictions, such as the state of health (SoH) and the state of function (SoF) of the battery 518. The BMS may communicate the information of the battery 518 to the application circuitry 502 or other components of the platform 500. The BMS may also include an analog-to-digital (ADC) convertor that allows the application circuitry 502 to directly monitor the voltage of the battery 518 or the current flow from the battery 518. The battery parameters may be used to determine actions that the platform 500 may perform, such as transmission frequency, network operation, sensing frequency, and the like.

A power block, or other power supply coupled to an electrical grid may be coupled with the BMS to charge the battery 518. In some examples, the power block may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 518, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 526 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 526 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensors 510 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 6:
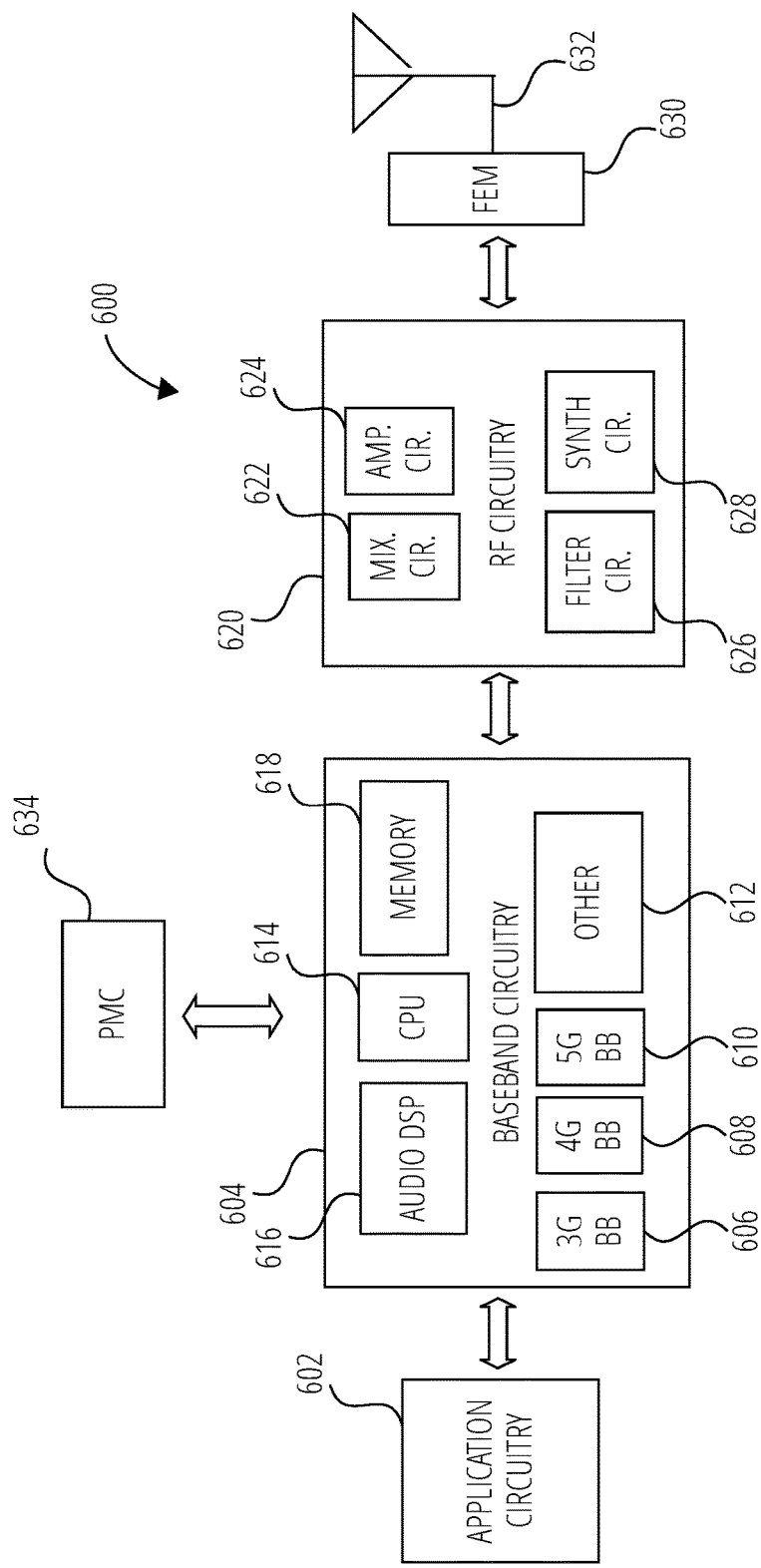
FIG. 6 illustrates a device in accordance with one embodiment.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing Unit (CPU 614). The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
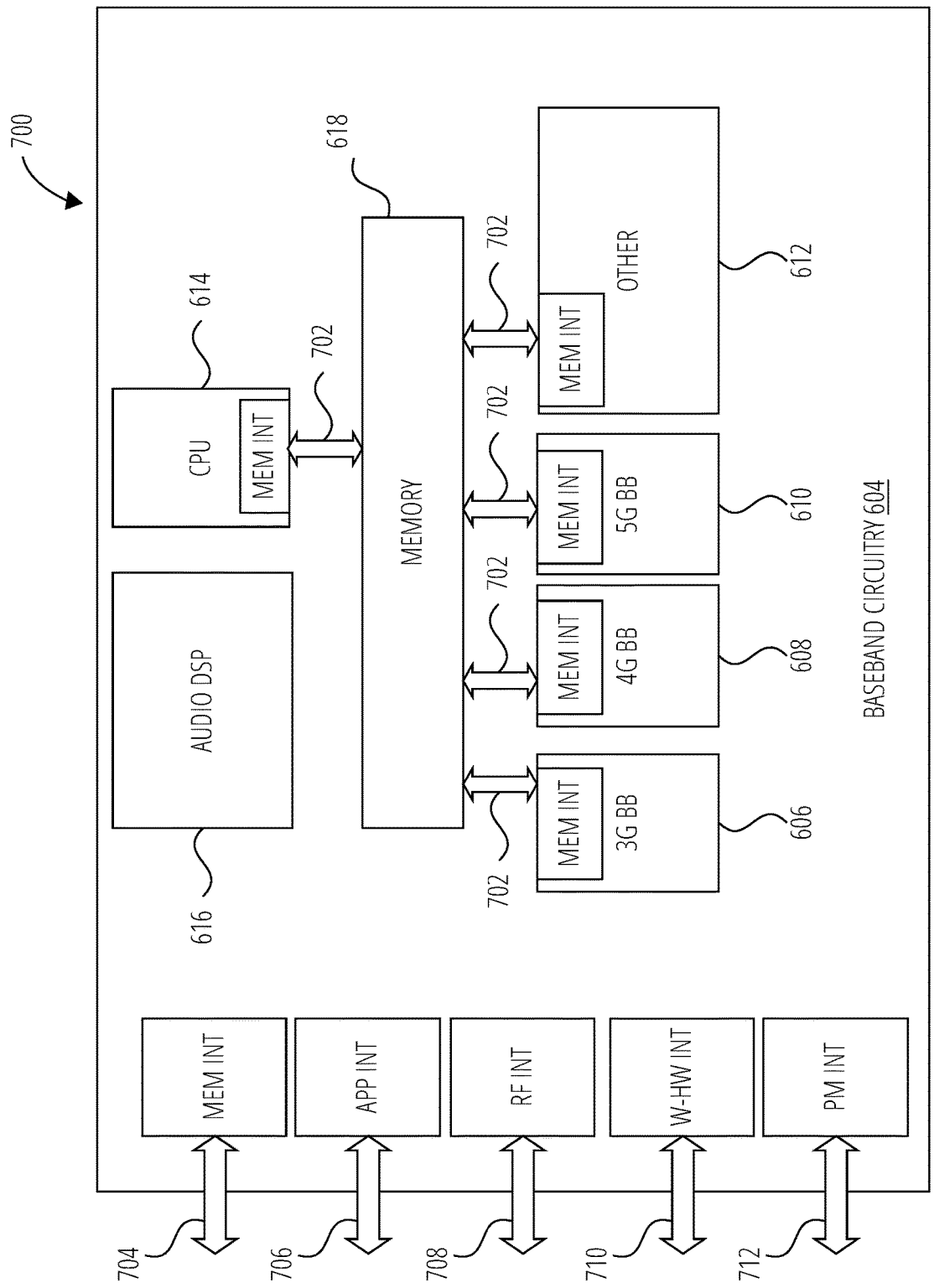
FIG. 7 illustrates example interfaces in accordance with one embodiment.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 702 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

Figure 8:
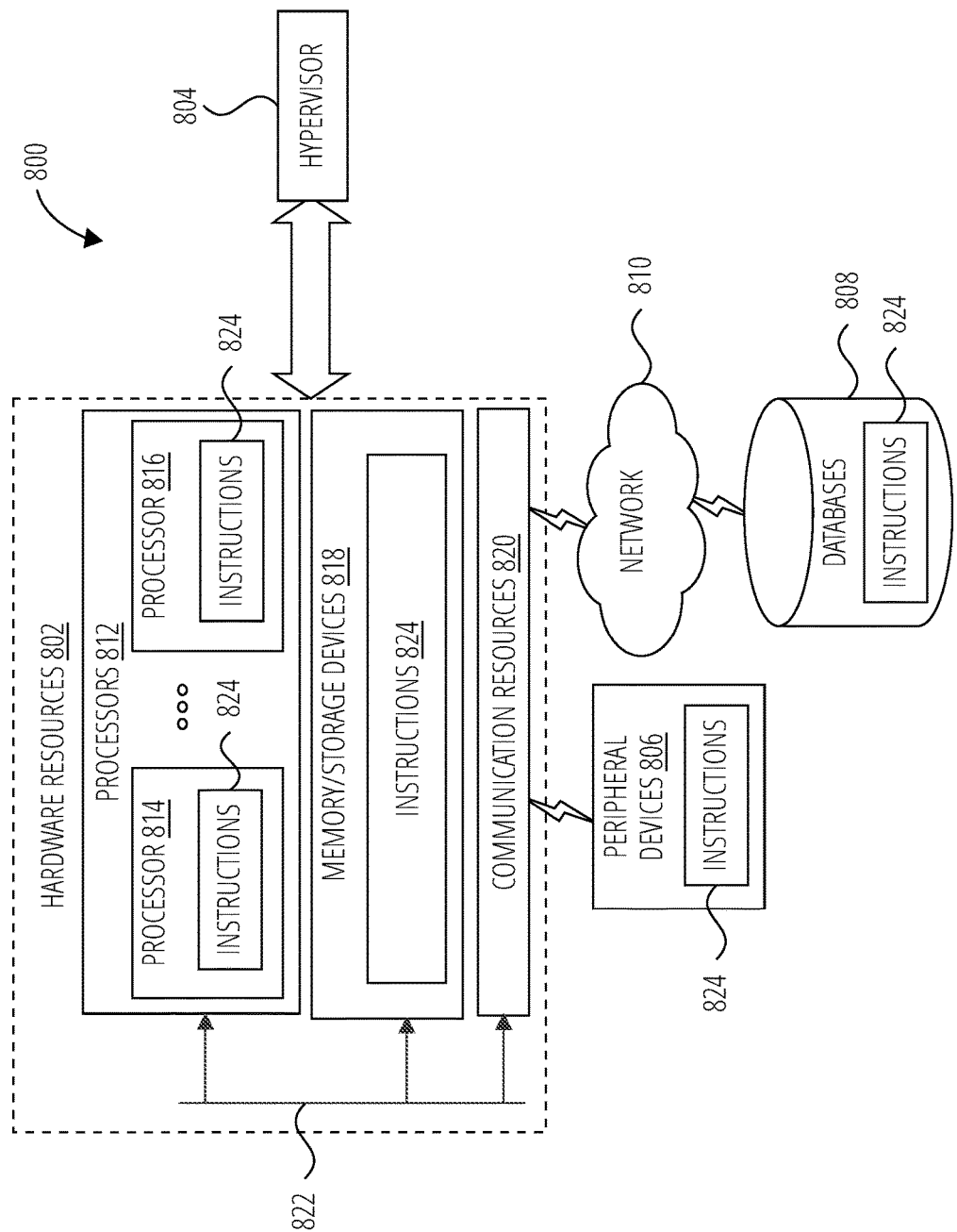
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1A may include an apparatus of a user equipment (UE), comprising one or more processors configured to: connect to a first radio access network (RAN) of a first radio access technology (RAT); create a connection associated with a voice call, wherein creating the connection associated with the voice call includes performing a handover procedure or a redirection procedure to a second RAN of a second RAT; in response to the voice call connecting to the second RAN, store information for both a frequency and a cell associated with connecting to the first RAN; identify that the voice call has ended; and in response to determining that the voice call has ended: generate a timer at the UE comprising a specified time period; and utilize the timer and the information stored for both the frequency and the cell associated with connecting to the first RAN to re-connect to the first RAN; and a memory configured to store the information for both the frequency and the cell associated with connecting to the first RAN.

Example 2A may include the apparatus of example 1A, wherein the first RAT comprises a new radio (NR) RAT and the second RAT comprises a long term evolution (LTE) RAT, and wherein the one or more processors are further configured to: determine that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and at least partially in response to determining that re-connection to the first RAN has occurred, stop the generated timer.

Example 3A may include the apparatus of example 1A, wherein the first RAT comprises a new radio (NR) RAT and the second RAT comprises a long term evolution (LTE) RAT, and wherein the one or more processors are further configured to: determine that connection to the second RAN has been terminated and that the generated timer has not yet expired; and in response to determining that connection to the second RAN has been terminated and that the generated timer has not yet expired: stop the generated timer; and force immediate re-selection associated with the first RAN based on the information stored for both the frequency and the cell associated with connecting to the first RAN.

Example 4A may include the apparatus of example 3A, wherein immediate re-selection associated with the first RAN comprises using the information stored for both the frequency and the cell associated with connecting to the first RAN without measuring candidate cells or comparing measurements to re-selection thresholds.

Example 5A may include the apparatus of example 3A, wherein the one or more processors are further configured to: determine that the immediate re-selection was not successful; and in response to determining that the immediate re-selection was not successful, perform cell selection on one or more cells of the first RAN that are different than the cell associated with connecting to the first RAN.

Example 6A may include the apparatus of example 5A, wherein the one or more processors are further configured to: determine that performing cell selection on the one or more cells of the first RAN was unsuccessful; and in response to determining that performing cell selection was unsuccessful, re-connect to the second RAN.

Example 7A may include the apparatus of example 1A, wherein the first RAT comprises a new radio (NR) RAT and the second RAT comprises a long term evolution (LTE) RAT, and wherein the instructions further configure the one or more processors to: determine that the specified time of the generated timer has expired and that connection to the second RAN has not been terminated; and in response to determining that the specified time of the generated timer has expired and that connection to the second RAN has not been terminated: stop the generated timer; abort the connection with the second RAN; and perform re-direction associated with the first RAN based on the information stored for both the frequency and the cell associated with connecting to the first RAN.

Example 8A may include the apparatus of example 7A, wherein re-direction associated with the first RAN comprises using the information stored for both the frequency and the cell associated with connecting to the first RAN without measuring candidate cells or comparing measurements to re-selection thresholds.

Example 9A may include the apparatus of example 7A, wherein the one or more processors are further configured to: determine that the performed re-direction associated with the first RAN was unsuccessful; and in response to determining that the performed re-direction was unsuccessful, perform cell selection on one or more cells of the first RAN that are different than the cell associated with connecting to the first RAN.

Example 10A may include the apparatus of example 7A, wherein the one or more processors are further configured to: determine that performing cell selection on the one or more cells of the first RAN was unsuccessful; and in response to determining that performing cell selection was unsuccessful, re-connect to the second RAN.

Example 11A may include the apparatus of claim 7A, wherein the specified time period of the generated timer is 100 milliseconds.

Example 12A may include a computer-readable storage medium, the computer-readable storage medium including instructions that when executed by a processor of a user equipment (UE) configured to re-connect to a first radio access network (RAN) of a first radio access technology (RAT), cause the processor to: connect to the first RAN; create a connection associated with a voice call, wherein creating the connection associated with the voice call includes performing a handover procedure or a redirection procedure to a second RAN of a second RAT; in response to the voice call connecting to the second RAN, store information for both a frequency and a cell associated with connecting to the first RAN; identify that the voice call has ended; and in response to determining that the voice call has ended: generate a timer at the UE comprising a specified time period; and utilize the timer and the information stored for both the frequency and the cell associated with connecting to the first RAN to re-connect to the first RAN.

Example 13A may include the computer-readable storage medium of example 12A, wherein the first RAT comprises a new radio (NR) RAT and the second RAT comprises a long term evolution (LTE) RAT, and wherein the instructions further configure the processor to: determine that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and at least partially in response to determining that re-connection to the first RAN has occurred, stop the generated timer.

Example 14A may include the computer-readable storage medium of example 12A, wherein the first RAT comprises a new radio (NR) RAT and the second RAT comprises a long term evolution (LTE) RAT, and wherein the instructions further configure the processor to: determine that connection to the second RAN has been terminated and that the generated timer has not yet expired; and in response to determining that connection to the second RAN has been terminated and that the generated timer has not yet expired: stop the generated timer; and force immediate re-selection associated with the first RAN based on the information stored for both the frequency and the cell associated with connecting to the first RAN.

Example 15A may include the computer-readable storage medium of example 14A, wherein immediate re-selection associated with the first RAN comprises using the information stored for both the frequency and the cell associated with connecting to the first RAN without measuring candidate cells or comparing measurements to re-selection thresholds.

Example 16A may include the computer-readable storage medium of example 14A, wherein the instructions further configure the processor to: determine that the immediate re-selection was not successful; and in response to determining that the immediate re-selection was not successful, perform cell selection on one or more cells of the first RAN that are different than the cell associated with connecting to the first RAN.

Example 17A may include the computer-readable storage medium of example 16A, wherein the instructions further configure the processor to: determine that performing cell selection on the one or more cells of the first RAN was unsuccessful; and in response to determining that performing cell selection was unsuccessful, re-connect to the second RAN.

Example 18A may include the computer-readable storage medium of example 12A, wherein the first RAT comprises a new radio (NR) RAT and the second RAT comprises a long term evolution (LTE) RAT, and wherein the instructions further configure the processor to: determine that the specified time of the generated timer has expired and that connection to the second RAN has not been terminated; and in response to determining that the specified time of the generated timer has expired and that connection to the second RAN has not been terminated: stop the generated timer; abort the connection with the second RAN; and perform re-direction associated with the first RAN based on the information stored for both the frequency and the cell associated with connecting to the first RAN.

Example 19A may include the computer-readable storage medium of example 18A, wherein re-direction associated with the first RAN comprises using the information stored for both the frequency and the cell associated with connecting to the first RAN without measuring candidate cells or comparing measurements to re-selection thresholds.

Example 20A may include the computer-readable storage medium of example 18A, wherein the instructions further configure the processor to: determine that the performed re-direction associated with the first RAN was unsuccessful; and in response to determining that the performed re-direction was unsuccessful, perform cell selection on one or more cells of the first RAN that are different than the cell associated with connecting to the first RAN.

Example 21A may include the computer-readable storage medium of example 18A, wherein the instructions further configure the processor to: determine that performing cell selection on the one or more cells of the first RAN was unsuccessful; and in response to determining that performing cell selection was unsuccessful, re-connect to the second RAN.

Example 22A may include the computer-readable storage medium of example 18A, wherein the specified time period of the generated timer is 500 milliseconds.

Example 23A may include a method of a user equipment (UE) re-connecting to a first radio access network (RAN) of a first radio access technology (RAT), the method comprising: connecting to the first RAN; creating a connection associated with a voice call, wherein creating the connection associated with the voice call includes performing a handover procedure or a redirection procedure to a second RAN of a second RAT; in response to the voice call connecting to the second RAN, storing information for both a frequency and a cell associated with connecting to the first RAN; identifying that the voice call has ended; and in response to determining that the voice call has ended: generating a timer at the UE comprising a specified time period; and utilizing the timer and the information stored for both the frequency and the cell associated with connecting to the first RAN to re-connect to the first RAN.

Example 24A may include the method of example 23A, wherein the first RAT comprises a new radio (NR) RAT and the second RAT comprises a long term evolution (LTE) RAT, and wherein utilizing the timer and the information stored for both the stored frequency and the cell further comprises: determining that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and at least partially in response to determining that re-connection to the first RAN has occurred, stopping the generated timer.

Example 25A may include the method of example 23A, wherein the first RAT comprises a new radio (NR) RAT and the second RAT comprises a long term evolution (LTE) RAT, and wherein utilizing the timer and the information stored for both the stored frequency and the cell further comprises: determining that connection to the second RAN has been terminated and that the generated timer has not yet expired; and in response to determining that connection to the second RAN has been terminated and that the generated timer has not yet expired: stopping the generated timer; and forcing immediate re-selection associated with the first RAN based on the information stored for both the frequency and the cell associated with connecting to the first RAN.

Example 26A may include the method of example 23A, wherein the first RAT comprises a new radio (NR) RAT and the second RAT comprises a long term evolution (LTE) RAT, and wherein utilizing the timer and the information stored for both the stored frequency and the cell further comprises: determining that the specified time of the generated timer has expired and that connection to the second RAN has not been terminated; and in response to determining that the specified time of the generated timer has expired and that connection to the second RAN has not been terminated: stopping the generated timer; aborting the connection with the second RAN; and performing re-direction associated with the first RAN based on the information stored for both the frequency and the cell associated with connecting to the first RAN.

Example 1B may include an apparatus comprising means to perform one or more elements of a method described in or related to any of the above Examples, or any other method or process described herein.

Example 2B may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3B may include an apparatus comprising logic, modules, or circuitry to perform one or more elements of a method described in or related to any of the above Examples, or any other method or process described herein.

Example 4B may include a method, technique, or process as described in or related to any of the above Examples, or portions or parts thereof.

Example 5B may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6B may include a signal as described in or related to any of the above Examples, or portions or parts thereof.

Example 7B may include a datagram, packet, frame, segment, protocol data unit (PDU), or message as described in or related to any of the above Examples, or portions or parts thereof, or otherwise described in the present disclosure.

Example 8B may include a signal encoded with data as described in or related to any of the above Examples, or portions or parts thereof, or otherwise described in the present disclosure.

Example 9B may include a signal encoded with a datagram, packet, frame, segment, PDU, or message as described in or related to any of the above Examples, or portions or parts thereof, or otherwise described in the present disclosure.

Example 10B may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11B may include a computer program comprising instructions, wherein execution of the program by a processing element is to cause the processing element to carry out the method, techniques, or process as described in or related to any of the above Examples, or portions thereof.

Example 12B may include a signal in a wireless network as shown and described herein.

Example 13B may include a method of communicating in a wireless network as shown and described herein.

Example 14B may include a system for providing wireless communication as shown and described herein.

Example 15B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus of a user equipment (UE), comprising:
one or more processors configured to:
connect to a first radio access network (RAN) of a first radio access technology (RAT);
create a connection associated with a voice call, wherein creating the connection associated with the voice call includes performing a handover procedure or a redirection procedure to a second RAN of a second RAT, wherein the first RAT comprises a new radio (NR) RAT and the second RAT comprises a long term evolution (LTE) RAT;
in response to the voice call connecting to the second RAN, store information for both a frequency and a cell associated with connecting to the first RAN;
identify that the voice call has ended;
in response to determining that the voice call has ended:
generate a timer at the UE comprising a specified time period; and
utilize the timer and the information stored for both the frequency and the cell associated with connecting to the first RAN to re-connect to the first RAN;
determine that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and
at least partially in response to determining that re-connection to the first RAN has occurred, stop the generated timer; and
a memory configured to store the information for both the frequency and the cell associated with connecting to the first RAN.

2. The apparatus of claim 1, wherein the one or more processors are further configured to:
determine that connection to the second RAN has been terminated and that the generated timer has not yet expired; and
in response to determining that connection to the second RAN has been terminated and that the generated timer has not yet expired:
stop the generated timer; and
force immediate re-selection associated with the first RAN based on the information stored for both the frequency and the cell associated with connecting to the first RAN.

3. The apparatus of claim 2, wherein immediate re-selection associated with the first RAN comprises using the information stored for both the frequency and the cell associated with connecting to the first RAN without measuring candidate cells or comparing measurements to re-selection thresholds.

4. The apparatus of claim 2, wherein the one or more processors are further configured to:
determine that the immediate re-selection was not successful; and
in response to determining that the immediate re-selection was not successful, perform cell selection on one or more cells of the first RAN that are different than the cell associated with connecting to the first RAN.

5. The apparatus of claim 4, wherein the one or more processors are further configured to:
determine that performing cell selection on the one or more cells of the first RAN was unsuccessful; and
in response to determining that performing cell selection was unsuccessful, re-connect to the second RAN.

6. The apparatus of claim 1, wherein the instructions further configure the one or more processors to:
determine that the specified time of the generated timer has expired and that connection to the second RAN has not been terminated; and
in response to determining that the specified time of the generated timer has expired and that connection to the second RAN has not been terminated:
stop the generated timer;
abort the connection with the second RAN; and
perform re-direction associated with the first RAN based on the information stored for both the frequency and the cell associated with connecting to the first RAN.

7. The apparatus of claim 6, wherein re-direction associated with the first RAN comprises using the information stored for both the frequency and the cell associated with connecting to the first RAN without measuring candidate cells or comparing measurements to re-selection thresholds.

8. The apparatus of claim 6, wherein the one or more processors are further configured to:
determine that the performed re-direction associated with the first RAN was unsuccessful; and
in response to determining that the performed re-direction was unsuccessful, perform cell selection on one or more cells of the first RAN that are different than the cell associated with connecting to the first RAN.

9. The apparatus of claim 6, wherein the one or more processors are further configured to:
determine that performing cell selection on the one or more cells of the first RAN was unsuccessful; and
in response to determining that performing cell selection was unsuccessful, re-connect to the second RAN.

10. The apparatus of claim 6, wherein the specified time period of the generated timer is 100 milliseconds.

11. A computer-readable storage medium, the computer-readable storage medium including instructions that when executed by a processor of a user equipment (UE) configured to reconnect to a first radio access network (RAN) of a first radio access technology (RAT), cause the processor to:
connect to the first RAN;
create a connection associated with a voice call, wherein creating the connection associated with the voice call includes performing a handover procedure or a redirection procedure to a second RAN of a second RAT, wherein the first RAT comprises a new radio (NR) RAT and the second RAT comprises a long term evolution (LTE) RAT;
in response to the voice call connecting to the second RAN, store information for both a frequency and a cell associated with connecting to the first RAN;
identify that the voice call has ended;
in response to determining that the voice call has ended:
generate a timer at the UE comprising a specified time period; and
utilize the timer and the information stored for both the frequency and the cell associated with connecting to the first RAN to re-connect to the first RAN;
determine that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and
at least partially in response to determining that re-connection to the first RAN has occurred, stop the generated timer.

12. The computer-readable storage medium of claim 11, wherein the instructions further configure the processor to:
determine that connection to the second RAN has been terminated and that the generated timer has not yet expired; and
in response to determining that connection to the second RAN has been terminated and that the generated timer has not yet expired:
stop the generated timer; and
force immediate re-selection associated with the first RAN based on the information stored for both the frequency and the cell associated with connecting to the first RAN.

13. The computer-readable storage medium of claim 12, wherein immediate re-selection associated with the first RAN comprises using the information stored for both the frequency and the cell associated with connecting to the first RAN without measuring candidate cells or comparing measurements to re-selection thresholds.

14. The computer-readable storage medium of claim 12, wherein the instructions further configure the processor to:
determine that the immediate re-selection was not successful; and
in response to determining that the immediate re-selection was not successful, perform cell selection on one or more cells of the first RAN that are different than the cell associated with connecting to the first RAN.

15. The computer-readable storage medium of claim 14, wherein the instructions further configure the processor to:
determine that performing cell selection on the one or more cells of the first RAN was unsuccessful; and in response to determining that performing cell selection was unsuccessful, re-connect to the second RAN.

16. The computer-readable storage medium of claim 11, wherein the instructions further configure the processor to:
determine that the specified time of the generated timer has expired and that connection to the second RAN has not been terminated; and
in response to determining that the specified time of the generated timer has expired and that connection to the second RAN has not been terminated:
stop the generated timer;
abort the connection with the second RAN; and
perform re-direction associated with the first RAN based on the information stored for both the frequency and the cell associated with connecting to the first RAN.

17. The computer-readable storage medium of claim 16, wherein re-direction associated with the first RAN comprises using the information stored for both the frequency and the cell associated with connecting to the first RAN without measuring candidate cells or comparing measurements to re-selection thresholds.

18. The computer-readable storage medium of claim 16, wherein the instructions further configure the processor to:
determine that the performed re-direction associated with the first RAN was unsuccessful; and
in response to determining that the performed re-direction was unsuccessful, perform cell selection on one or more cells of the first RAN that are different than the cell associated with connecting to the first RAN.

19. The computer-readable storage medium of claim 16, wherein the instructions further configure the processor to:
determine that performing cell selection on the one or more cells of the first RAN was unsuccessful; and
in response to determining that performing cell selection was unsuccessful, re-connect to the second RAN.

20. The computer-readable storage medium of claim 16, wherein the specified time period of the generated timer is 500 milliseconds.

21. A method of a user equipment (UE) re-connecting to a first radio access network (RAN) of a first radio access technology (RAT), the method comprising:
connecting to the first RAN;
creating a connection associated with a voice call, wherein creating the connection associated with the voice call includes performing a handover procedure or a redirection procedure to a second RAN of a second RAT, wherein the first RAT comprises a new radio (NR) RAT and the second RAT comprises a long term evolution (LTE) RAT;
in response to the voice call connecting to the second RAN, storing information for both a frequency and a cell associated with connecting to the first RAN;
identifying that the voice call has ended;
in response to determining that the voice call has ended:
generating a timer at the UE comprising a specified time period; and
utilizing the timer and the information stored for both the frequency and the cell associated with connecting to the first RAN to re-connect to the first RAN;
determining that a radio resource control (RRC) connection release associated with the second RAN with re-direction to thereby re-connect to the first RAN occurred before the specified time period of the generated timer expired or that handover to thereby connect to the first RAN occurred before the specified time period of the generated timer expired; and at least partially in response to determining that re-connection to the first RAN has occurred, stopping the generated timer.

22. The method of claim 21, wherein utilizing the timer and the information stored for both the stored frequency and the cell further comprises:
   determining that connection to the second RAN has been terminated and that the generated timer has not yet expired; and
   in response to determining that connection to the second RAN has been terminated and that the generated timer has not yet expired:
      stopping the generated timer; and
      forcing immediate re-selection associated with the first RAN based on the information stored for both the frequency and the cell associated with connecting to the first RAN.

23. The method of claim 21, wherein utilizing the timer and the information stored for both the stored frequency and the cell further comprises:
   determining that the specified time of the generated timer has expired and that connection to the second RAN has not been terminated; and
   in response to determining that the specified time of the generated timer has expired and that connection to the second RAN has not been terminated:
      stopping the generated timer;
      aborting the connection with the second RAN; and
      performing re-direction associated with the first RAN based on the information stored for both the frequency and the cell associated with connecting to the first RAN.

* * * * *